US007397798B2

(12) United States Patent
Svensson et al.

(10) Patent No.: US 7,397,798 B2
(45) Date of Patent: Jul. 8, 2008

(54) METHOD AND APPARATUS FOR PROCESSING BLOCKS IN A PIPELINE

(75) Inventors: Lars-Olov Svensson, Stockholm (SE); Thomas Stromqvist, Solna (SE); Gunnar Nordmark, Danderyd (SE); Par Westlund, Stockholm (SE); Joachim Roos, Nacka (SE)

(73) Assignee: Xelerated AB, Stockholm (SE)

( * ) Notice: Subject to any disclaimer, the term of this patent is extended or adjusted under 35 U.S.C. 154(b) by 795 days.

(21) Appl. No.: 10/478,377

(22) PCT Filed: May 21, 2001

(86) PCT No.: PCT/SE01/01133

§ 371 (c)(1),
(2), (4) Date: May 7, 2004

(87) PCT Pub. No.: WO02/096043

PCT Pub. Date: Nov. 28, 2002

(65) Prior Publication Data

US 2004/0215620 A1    Oct. 28, 2004

(51) Int. Cl.
*H04L 12/56* (2006.01)
(52) U.S. Cl. ........................................ 370/392; 370/389
(58) Field of Classification Search ................ 712/227, 712/225; 370/389, 392, 401, 419, 428, 429, 370/465, 466, 471, 474; 709/250
See application file for complete search history.

(56) References Cited

U.S. PATENT DOCUMENTS

| 5,234,595 | A | * | 8/1993 | DiGregorio et al. | ......... 210/605 |
|---|---|---|---|---|---|
| 5,268,900 | A | * | 12/1993 | Hluchyj et al. | ............... 370/429 |
| 5,566,170 | A | * | 10/1996 | Bakke et al. | ................. 370/392 |
| 5,598,410 | A | * | 1/1997 | Stone | .......................... 370/469 |
| 5,634,034 | A | * | 5/1997 | Foster | ......................... 711/147 |
| 6,182,211 | B1 | * | 1/2001 | Yamasaki | .................... 712/239 |
| 6,490,248 | B1 | * | 12/2002 | Shimojo | ..................... 370/229 |
| 6,570,876 | B1 | * | 5/2003 | Aimoto | ....................... 370/389 |
| 6,618,378 | B1 | * | 9/2003 | Giroux et al. | ............ 370/395.1 |
| 6,724,767 | B1 | * | 4/2004 | Chong et al. | ................. 370/412 |
| 6,757,249 | B1 | * | 6/2004 | Kejriwal et al. | .......... 370/235.1 |
| 7,006,505 | B1 | * | 2/2006 | Bleszynski et al. | ..... 370/395.72 |
| 7,027,442 | B2 | * | 4/2006 | Shirakawa et al. | .......... 370/392 |

FOREIGN PATENT DOCUMENTS

| EP | 0 717 533 | 6/1996 |
|---|---|---|
| WO | 00/10297 | 2/2000 |

* cited by examiner

*Primary Examiner*—Aung S. Moe
*Assistant Examiner*—Redentor Pasia
(74) *Attorney, Agent, or Firm*—Young & Thompson

(57) ABSTRACT

Method in a pipeline processing stage in a processor, includes the steps of: receiving a first block from a first register and a first execution parameter associated with the first block from a second register, the execution parameter having a first value; inspecting a set of data being at least a part of the first block; and, if the set of data differs from a predetermined condition, storing a second execution parameter on a third register and a third execution parameter on the second register, where the second execution parameter has a second value and is associated with the first block and the third execution parameter has the first value and will be associated with a second block. The invention also relates to the pipeline processor, a module, an integrated circuit and a computer unit.

23 Claims, 12 Drawing Sheets

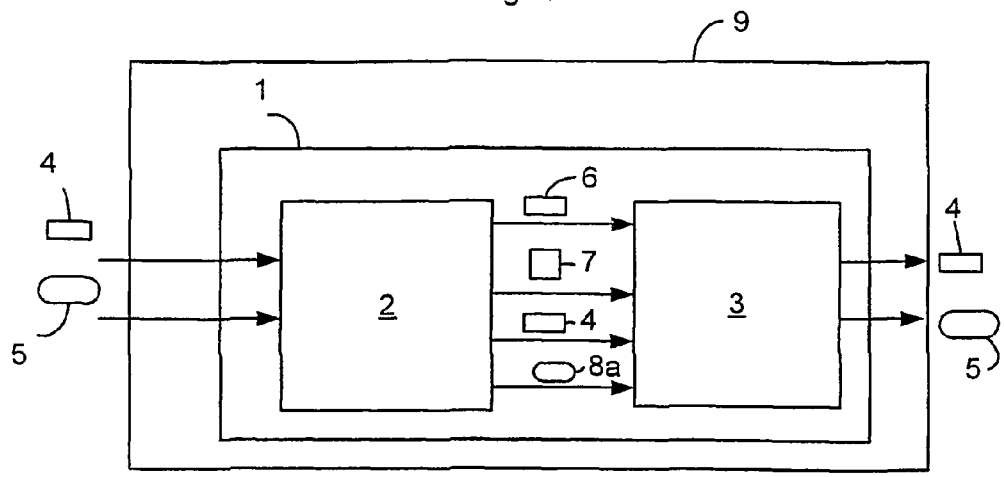
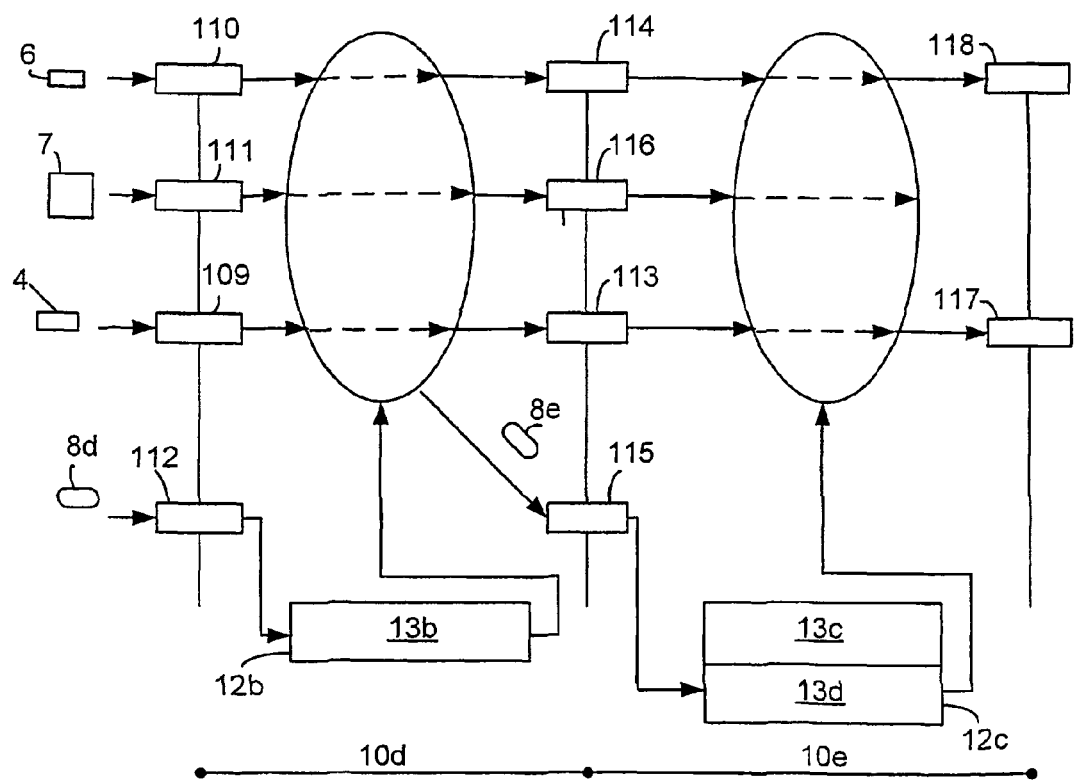

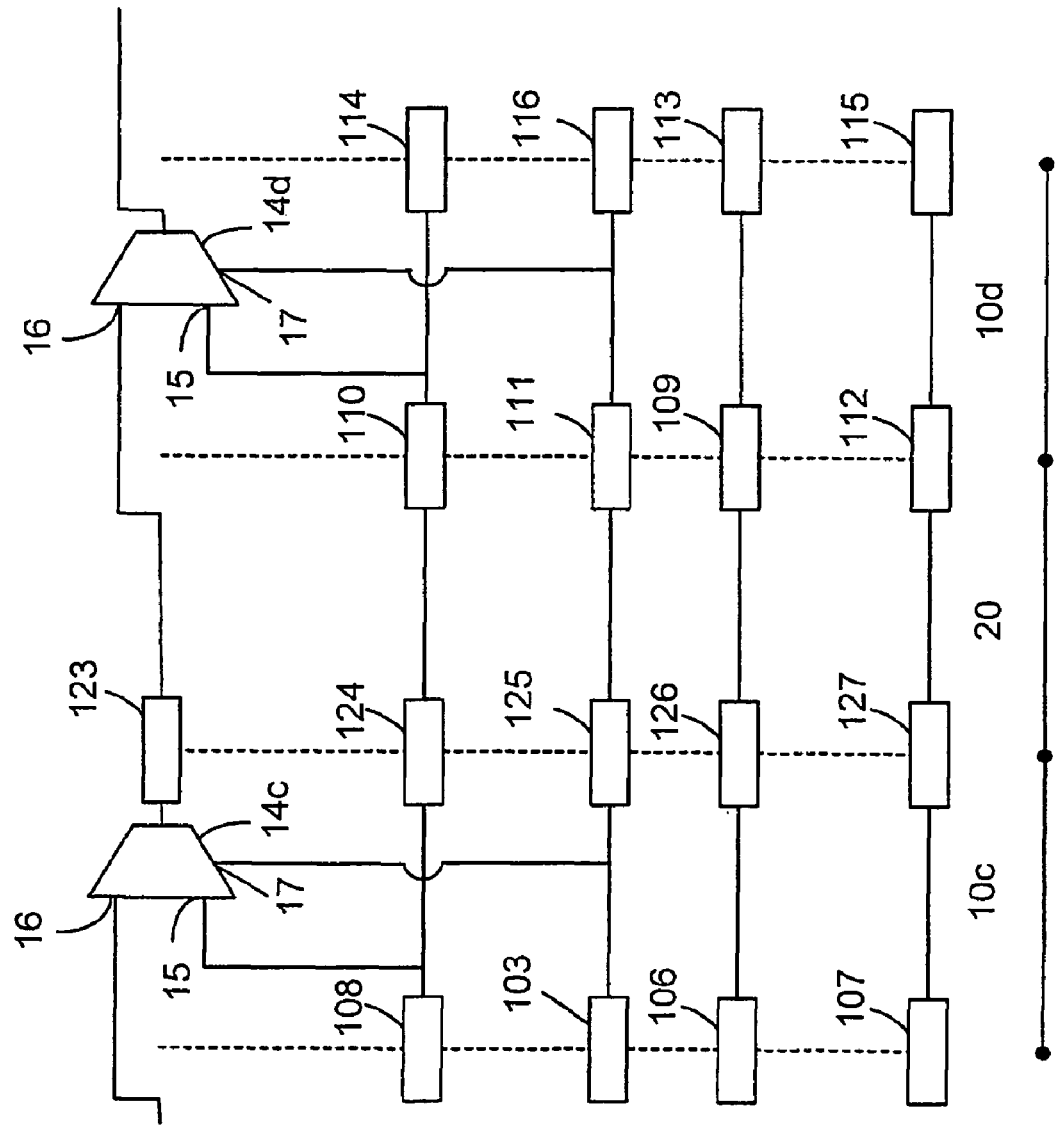

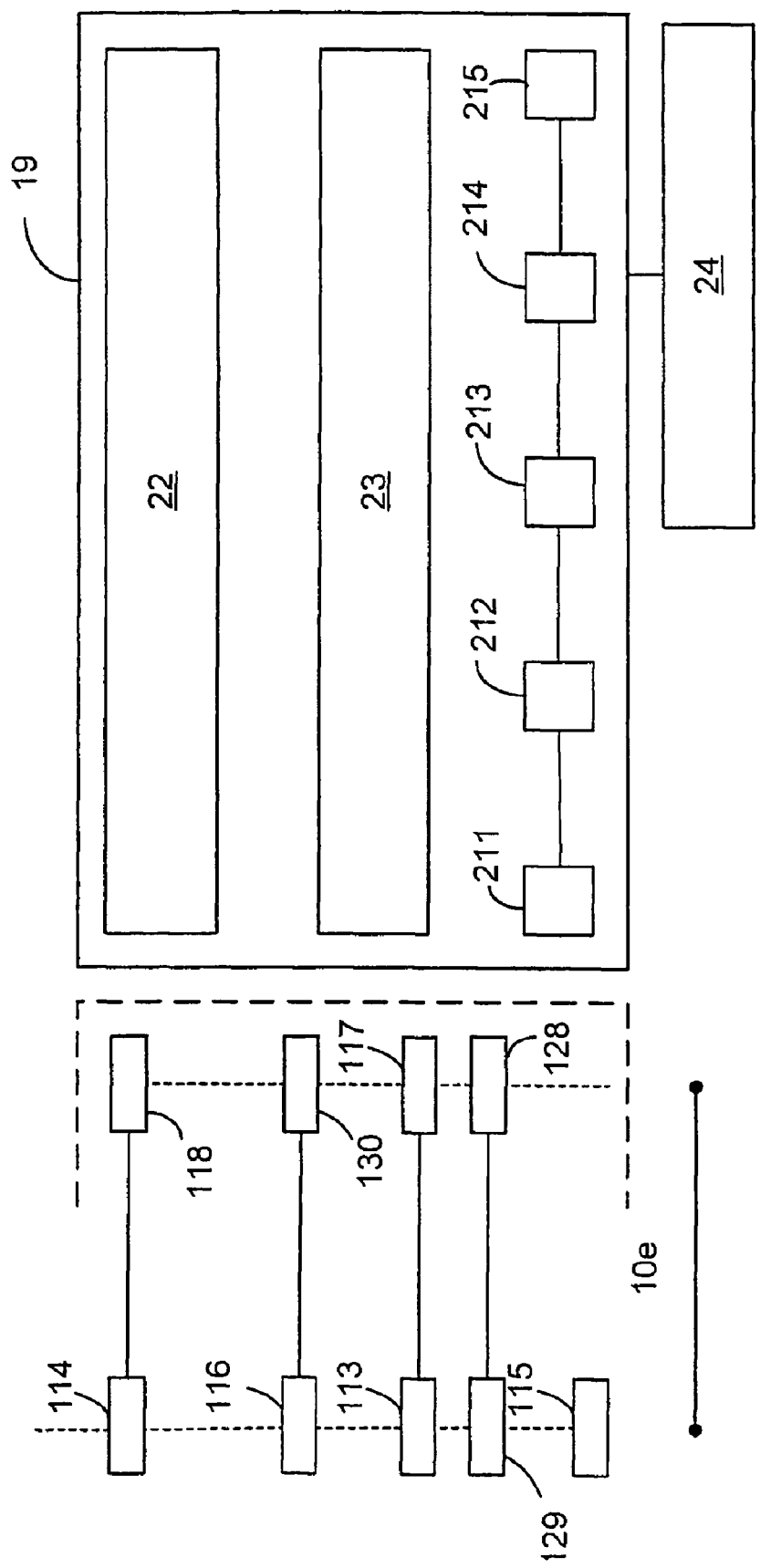

METHOD AND APPARATUS FOR PROCESSING BLOCKS IN A PIPELINE

TECHNICAL FIELD OF THE INVENTION

The present invention relates to a method in a pipeline processing stage in a processing means. The invention also relates to a pipeline processing means, two modules comprising the pipeline processing means, an integrated circuit comprising at least one of the modules and a computer unit comprising at least one integrated circuit.

BACKGROUND OF THE INVENTION

Data transported in a communications network is typically encapsulated in multiple layers of protocols, where each protocol has one or many stacked headers. For example, TCP (Transmission Control Protocol) over Ipv6 (Internet Protocol version 6) with stacked options, TCP over Ipsec (IP Security) over IP, or multiple stacked MPLS (MultiProtocol Label Switching) headers.

Tunneling enables traffic from one protocol to be carried inside the same or another similar layer protocol. For example IP carried inside MPLS, or SNA's (System Network Architecture) SDLC (Synchronous Data Link Architecture) packets and IPX (Internetwork Packet Exchange) can be carried inside IP.

In some cases, e.g. packet inspection in firewalls or Field Manipulation in NAT (Network Address Translation), there is a need to inspect and manipulate fields deep inside the packet, such as protocols corresponding to OSI (Open System Interconnection) layers higher than 3. See for example U.S. Pat. No. 5,884,025-A.

The combination of stacked headers is often dynamic and the communications equipment needs to be able to analyse the headers by inspecting certain fields and unwind these headers at runtime. Normally field inspection and manipulation by means of special purpose hardware is only capable of processing fixed size headers of OSI layer 2 and 3. Processing that needs to inspect fields deep in a packet or to unwind dynamic length headers, is performed more or less in software on a general-purpose processor, with resulting loss of wire speed performance. The more headers that need to be unwind to locate a particular field the more execution time a processor needs, since the software has to analyse or unwind one header at a time. This implies both that inspection and modification deep in a packet takes a long time and different times depending on the specific header configuration. Different times for different headers render a parallel processing of different packets more difficult.

SUMMARY

The present invention solves the problem of providing deep inspection of packets or other data sequences at wire-speed regardless of the type of packets.

The invention relates to a method in a pipeline processing stage in a processing means. The pipeline processing stage comprises the steps of:
receiving a first block from a first register and a first execution parameter associated with the first block from a second register, the first execution parameter having a first value;
inspecting a set of data being at least a part of the first block;
and, if the set of data differs from a predetermined condition,
storing a second execution parameter in a third register and a third execution parameter in the second register, where the second execution parameter has a second value and is associated with the first block during a next pipeline processing stage for the first block and the third execution parameter has the first value and will be associated with a second block, which is to be received in the pipeline processing stage after the first block has been forwarded to the next pipeline processing stage.

Hereby is achieved that an inspection of a block and a decision whether or not a subsequent operation on the block shall be executed, can be made without stalling the pipelined processing. Thus a block sliding window for deep inspection and modification of packets is created. Throughout the description and the appended claims, the execution parameter is defined as a parameter having either a value that determines that operations associated with a received program counter in a current stage shall be executed, or a value that determines that the operations shall not be executed.

Preferably, the first block and the second block are parts of a packet, e.g. an IP packet. Hereby is achieved that inspection of a packet of a protocol that corresponds to any OSI layer may be performed. Deep inspection without any specific software may be performed deeper in the packet in relation to the prior art. Protocols that correspond to any OSI layer shall be understood as including those protocols that usually are associated with another model for implementing protocols in different layers, but can be said to correspond to a protocol implemented in the OSI model. Examples of included protocols are protocols associated with the SNA layers, such as SDLC and the AppleTalk protocol suite.

Suitably, the method comprises the steps of:
receiving packet and block related data from a fourth register and, if the set of data differs from the predetermined condition, storing the packet and block related data in the fourth register after inspection of the set of data. Hereby is achieved that the packet and block related data for the first block is taken over by the second block in the clock tick after the clock tick for the processing of the first block in the pipeline processing stage.

Advantageously, the methods comprises the steps of:
receiving a program counter from a fifth register;
looking up a first instruction in an editable instruction table associated with the pipeline processing stage;
and, if the set of data differs from the predetermined condition, storing the program counter in the fifth register after the inspektion of the set of data.

Hereby is achieved that the program counter associated with the first block in the pipeline processing stage is taken over by the second block in the clock tick after the clock tick for the processing of the first block in the pipeline processing stage. It is also achieved that alternative instructions may be programed and stored in the editable instruction table, thus enabling e.g. jump instructions.

An alternative method according to the invention has the same effect and is a method in a pipeline processing stage in a processing means, comprising the steps of:
receiving a first block from a first register and a first execution parameter associated with the first block from a second register, the first execution parameter having a first value;
inspecting a set of data being at least a part of the first block;
and, if the set of data satisfy a predetermined condition,
storing a second execution parameter in a third register and a third execution parameter in the first register, where the second execution parameter has a second value and is associated with the first block during a next pipeline processing stage for the first block and the third execution parameter has the first value and will be associated with a second block, which is to be received in the pipeline processing stage after the first block has been forwarded to the next pipeline processing stage.

Preferably, the alternative method comprises the steps of: receiving packet and block related data from a fourth register and, if the set of data satisfy the predetermined condition, storing the packet and block related data in the fourth register after inspection of the set of data.

Suitably, the alternative method comprises the steps of: receiving a program counter from a fifth register;
looking up a first instruction in an editable instruction table associated with the pipeline processing stage;
and, if the set of data satisfy the predetermined condition, storing the program counter in the fifth register after the inspection of the set of data.

The invention also relates to a pipeline processing means for the methods. The processing means comprises registers for storing blocks of data being processed in at least two pipeline processing stages and at least one logic unit for executing operations on at least one of the blocks. Furthermore, the processing means comprises registers for storing execution parameters associated with the blocks, the execution parameters being used in the at least two pipeline processing stages for determining whether or not at least one operation shall be executed in the at least two pipeline processing stages. Hereby a pipeline processing means of a flexible architechture is achieved for performing at least one of the methods in one of the pipeline processing stages.

Preferably, the blocks are parts of a packet, e.g. an IP-packet. Hereby is achieved that deep inspection may be performed on a packet being processed in the pipeline processing means.

Suitably, the pipeline processing means comprises registers for storing packet and block related data associated with each one of the blocks.

In a first embodiment to forward valid packet and block related data, the pipeline processing means comprises an unclocked circuit adapted to receive the packet and block related data and send the packet and block related data to a last register of the registers for storing the packet and block related data. Hereby is achieved that a first block of a packet that leaves the pipeline processing means is associated with updated packet and block related data although the updating has been executed in a stage which the first block already has passed.

Preferably, the unclocked circuit comprises at least one multiplexer. Hereby is achieved that one of at least two input signals is chosen as an output signal from the at least one multiplexer.

Suitably, the unclocked circuit comprises one multiplexer connected to each one of the at least two processing stages, the multiplexer comprising a first port and a second port adapted to receive packet and block related data and a third port adapted to receive a signal representing a value of one of the execution parameters. Hereby is achieved that an execution parameter may be used as a control signal for a multiplexer, thus controlling the packet and block related data being sent to the last of the registers for the packet and block related data.

In a second embodiment to forward valid packet and block related data, the pipeline processing means comprises a clocked forwarding means that comprises at least one additional pipeline processing stage between at least two of the at least two pipeline processing stages, where the at least one additional pipeline processing stage comprises a register connected to the unclocked circuit between two multiplexers of the unclocked circuit. Hereby is achieved that forwarding of valid, updated packet and block related data is enabled in processing means with a large number of pipeline processing stages.

Advantageously, the pipeline processing means comprises registers for storing program counters associated with the blocks and at least one storage means for storing an editable instruction table for each one of the at least two pipeline processing stages.

The invention also relates to two modules for the methods. A first module comprises a pipeline processing means that comprises registers for storing blocks being processed in at least two pipeline processing stages and at least one logic unit for executing operations on at least one of the blocks. Furthermore, the first module comprises a FIFO buffer that comprises a shift register and is serially coupled to the processing means, which comprises registers for storing execution parameters associated with the blocks, the execution parameters being used in the at least two pipeline processing stages for determining whether or not at least one operation shall be executed in the at least two pipeline processing stages. In addition, the FIFO buffer may comprise at least a first FIFO memory means for storing packet and block related data and at least one second memory means adapted to store blocks. The shift register is adapted to receive and forward block number data associated with the blocks. Hereby is achieved that the forwarding of updated packet and block related data is done with the help of a FIFO buffer. Thus the inspection may be done in the last stage in the processing means.

The second module comprises a classification means for matching or identifying blocks of data, a pipeline processing means comprising registers for storing the blocks being processed in at least two pipeline processing stages and at least one logic unit for executing operations on at least one of the blocks. The processing means comprises registers for storing execution parameters associated with the blocks, the execution parameters being used in the at least two pipeline processing stages for determining whether or not at least one operation shall be executed in the at least two pipeline processing stages.

Moreover, the invention relates to an integrated circuit that comprises at least one of the first module or the second module.

The invention also relates to a computer unit, such as network computer unit or a signal processing computer unit, comprising at least one integrated circuit, where the at least one integrated circuit comprises at least one of the first module or the second module.

BRIEF DESCRIPTION OF THE DRAWINGS

The objects, advantages and effects as well as features of the present invention will be more readily understood from the following detailed description of embodiments of the invention, when read together with the accompanying drawings, in which:

FIG. 1 schematically shows an integrated circuit and a module for pipelined processing of data;

FIG. 5 shows two stages of the pipelined processing;

FIG. 7 is a flow diagram of a processing means according to a second embodiment of the invention; and FIG. 8 is a flow diagram of a processing means according to a third embodiment of the invention.

DETAILED DESCRIPTION OF EMBODIMENTS

Figure 2:
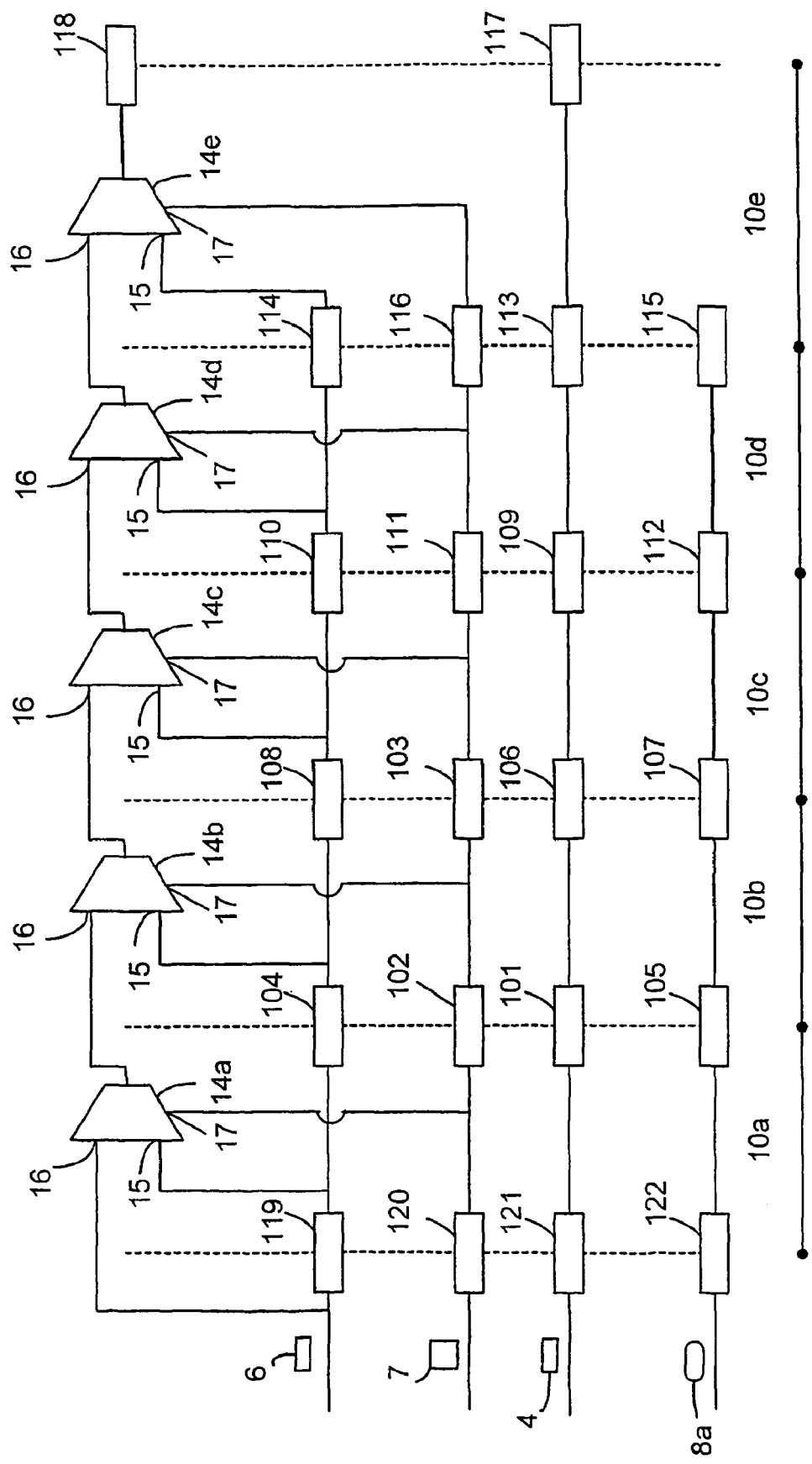
FIG. 2 is a flow diagram illustrating a processing means according to a first embodiment of the invention.

While the invention covers various modifications and alternative methods and systems, a preferred embodiment of the invention is shown in the drawings and will hereinafter be described in detail. However, it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims to the full range of their equivalents.

A module 1, which comprises a classification means 2 and a processing means 3 for pipelined processing, is schematically illustrated in FIG. 1. A block 4, such as a part of an IP-packet (Internet Protocol packet), is received by the classification means 2. A packet attribute 5, which may be a search vector, associated and retrieved from the block 4 is also received by the classification means 2. The block 4 is forwarded by the classification means 2 to the processing means 3 without changing the block 4. The processing means 3 also receives packet and block related data (PBRD) 6 associated with the block 4, an execution parameter 7 and a first program counter 8a from the classification means 2. The PBRD 6 may for example comprise information about the length, the beginning and the end of the packet and arguments associated with the block 4. Thereafter, the processing means 3 may perform different operations on the block 4, depending on, for instance, the type of block that has been classified by the classification means 2. The processing means 3 sends out the changed or the unchanged block 4 from the module 1. For performing a desired task, several modules 1 can be serially coupled to each other, e.g. in a schematically illustrated integrated circuit 9, thus creating an architecture of alternating classification means 2 and processing means 3. Parts of the PBRD 6 that leaves a first processing means 3 may for example be used as a packet attribute 5 for a second module. Technical features of the classification means 2 are disclosed in the Swedish patent application 0100221-1 filed by the applicant. The classification means 2 is not by itself a part of this invention and is therefore not described more. The integrated circuit 9 may be connected to a printed board adapted for a computer unit used for digital signal processing or in a network, e.g. a network computer unit for firewalling or routing of packets.

The processing means 3 may comprise any number of stages for pipelined processing of packets, but only five stages 10a-10e are disclosed in FIG. 2 for the purpose of explaining the invention. It is obvious that there can be any number of stages before the stages 10a-10e shown in FIG. 2 and/or any number of stages after the shown stages 10a-10e. The general principles of pipelining are known to a person ordinary skilled in the art, and therefore only the part of the processing related to the invention is disclosed. Each one of the stages 10a-10e are associated with a plurality of registers 101-122, i.e. small, high-speed computer circuits that hold values of internal operations. Before and after each stage 10a-10e, input data and output data are stored in the registers 101-122. The top flow of the four parallel flows shown in FIG. 2 through the processing means 3, illustrates the processing of the PBRD 6. The flow directly under the PBRD flow illustrates the processing of the execution parameter 7, the third flow illustrates the processing of the block 4, and the lowest flow illustrate the receiving of a program counter for every stage 10a-10e. As will be explained in the following, the structure shown in FIG. 2 allows the block 4, the PBRD 6, and the execution parameter 7 to be changed in each stage. Also, a new program counter is created in every new stage except the last one (stage 10e), since a program counter is not needed any more after the last stage.

Figure 3:
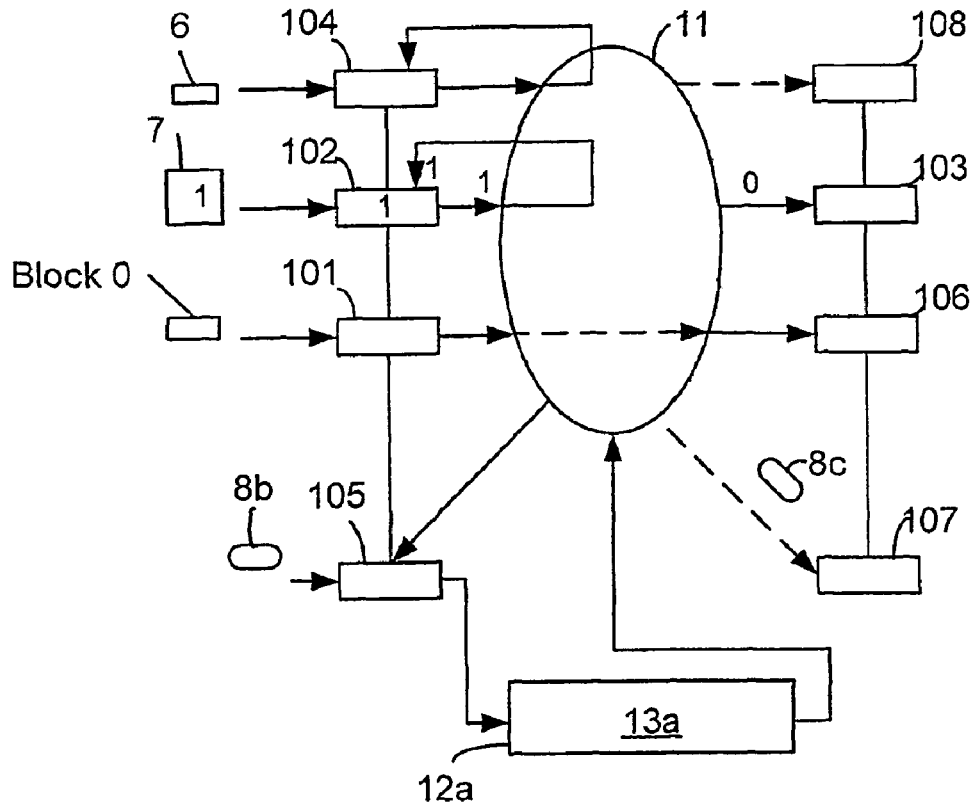
FIG. 3 illustrates a second stage when a block of data is received.

FIG. 3 shows the second stage 10b of the five stages 10a-10e shown in FIG. 2. However, it is to be understood that anyone of the stages in the processing means according to the invention may operate in the way that shall be disclosed now. On the analogy of FIG. 2, the four flows described in connection with FIG. 2 are also shown in FIG. 3. The block 4 is received and stored in a first register 101, which is used as an input register for the second stage 10b and an output register for the block 4 from the first stage 10a. At substantially the same time, the execution parameter 7 is stored in a second register 102, which is used as an input register for the second stage 10b. A third register 103 is used as an output register for the execution parameter 7 of the second stage 10b. Furthermore, at substantially the same time as the storing in the first and the second register, 101 and 102, the PBRD 6 is received and stored in a fourth register 104 and a second program counter 8b is received and stored in a fifth register 105.

In order to describe the invention, a sequence of six clock ticks will now be used. A first clock tick is the earliest clock tick, a second clock comes immediately after the first clock tick, a third clock tick comes immediately after the second clock tick, and so forth in a logical subsequent order. Also, a packet A comprising four blocks will be used as an example of a packet being processed in the processing means. The first of the blocks of packet A is Block A0, the second is Block A1, the third is Block A2 and the fourth is Block A3.

In the beginning of the second clock tick, a logic unit 11 receives the Block A0 (see FIG. 3), the execution parameter 7 and the PBRD 6, from the first, the second and the fourth register respectively. The second program counter 8b is used for looking up a corresponding instruction stored in an editable, first instruction table 12a, which is associated with at least the second stage 10b and is comprised in a storage means included in the processing means 3. Here, the first instruction table 12a comprises only a first instruction 13a for inspecting at least a part of blocks being processed in the second stage 10b. Although not shown in this embodiment, the first instruction table 12a may in other embodiments of the invention comprise any number of instructions, for example instructions for different ways of inspecting different parts of the blocks. The first instruction 13a comprises editable instruction fields (not shown) and corresponds to the second program counter 8b. When the first instruction 13a is looked up, it is sent to the logic unit 11 for execution of inspection operations corresponding to at least a part of the first instruction 13a.

The logic unit 11 comprises means, i.e. a logic sub-unit, for creating new program counters and means for executing the operations associated with a received instruction. In this example, the means for executing the operations is an ALU (Arithmetic Logic Unit). An ALU is known to a person skilled in the art and is therefore not described more in detail.

In FIG. 3, the Block A0 is associated with an execution parameter 7 having the value '1'. In all the stages of the shown embodiments of the invention, the value '1' determines that operations associated with a received program counter in a current stage shall be executed. A value '0' means that no operation shall be executed on the received block and/or the PBRD 6. Of course values other than '1', such as '0', could be used as a determining value for execution and vice versa. When the value '1' is received by the logic unit 11, the inspection operations corresponding to the first instruction 13*a* are executed on the Block A0. The inspection is done with the help of a predetermined condition and if the inspected part of Block A0 differs from the condition, the data of the PBRD 6 in the fourth register 104 is "preserved" for use in the second stage 10*b* for Block A1, which is to be processed in the second stage 10*b* during the third clock tick. Also, the value '1' of the execution parameter is preserved in the second register 102 and the second program counter 8*b* is preserved in the fifth register 105. The "preservation" in the second, fourth and fifth register is done by sending the received values of the execution parameter, the PBRD and the second program counter 8*b* back to the registers from which they came. These "resent" values have priority over values representing the program counter, the execution parameter 7 and the PBRD 6 that are associated with Block A1 and coming from the first stage 10*a* during the second clock tick. Arrangements for storing a value from the second stage 10*b* instead of values sent from the first stage 10*a* in a register ordinary adapted for receiving values from the first stage 10*a*, are e.g. multiplexors or gate circuits (not shown).

Before the second stage 10*b* for the Block A0 has ended, i.e. the second clock tick, an execution parameter 7 having the value "0" is sent to the third register 103. Also, the Block A0 is stored in a sixth register 106. Furthermore, a third program pointer 8*c* may be created and sent to a seventh register 107 and the PBRD 6 may be sent to an eighth register 108, but the values being stored in the seventh and eighth register, 107 and 108 respectively, are in this embodiment of no practical importance, since the value '0' sent to the third register 103 throughout all the following stages 10*c*-10*e* will indicate that no further operations shall be performed on the Block A0 or the PBRD 6 received in association with the Block A0. Hence, any value for the third program counter 8*c* and the PBRD 6 associated with the Block A0 could be sent to the seventh and eighth register respectively.

The processing illustrated in FIG. 3 in the second stage 10*b*, may also be performed during the following clock ticks for a number of subsequent blocks belonging to the packet A as long as the inspected parts of the blocks differ from the predetermined condition used in the inspection.

Figure 4:
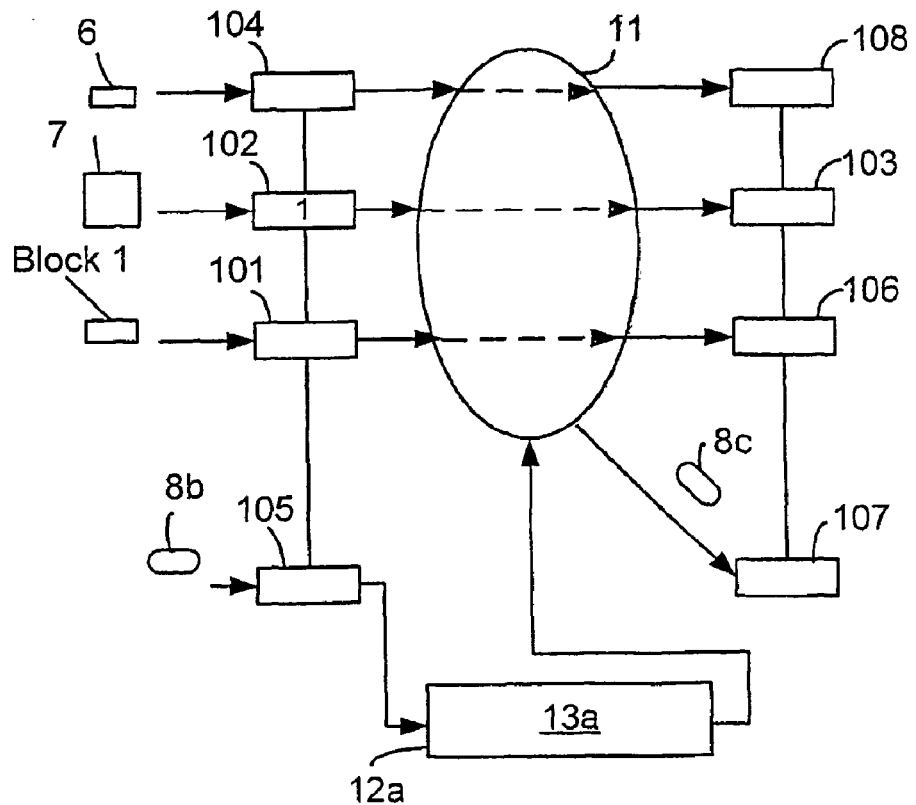
FIG. 4 illustrates the second stage when another block of data is received.

FIG. 4 illustrates the processing of a block and its associated second program counter 8*b*, execution parameter 7 and PBRD 6 when the inspected part of the block satisfies the condition. In this example the block is the Block A1. Hence, according to the description related to FIG. 3, when the processing of the Block A1 in the second stage 10*b* starts (the third clock tick), the value of the execution parameter 7 in the second register 102 is "1" although a "0" was sent to the second register 102 from the first stage 10*a* during the second clock tick. Since the inspected part of the Block A1 satisfy the condition, the value "1" for the execution parameter is stored in the third register 103. The value "1" of the execution parameter associated with Block A1 thereby follows the Block A1 to the third stage 10*c*, where operations are executed during the fourth clock tick because of the value "1". In the second stage 10*b*, the Block A1, the associated PBRD and a third program counter 8*c* created by the logic unit 11 are forwarded to the sixth, eighth and seventh register respectively. During the third clock tick, there is no preservation of the PBRD 6, execution parameter 7 and the second program counter 8*b* in the second, fourth and fifth register in the way described above in conjunction with FIG. 3. Therefore, a new execution parameter 7 associated with the following Block A2, is stored in the second register 102 at the end of the third clock tick and is used in the second stage 10*b* during the fourth clock tick. If the execution parameter 7 associated with the Block A2 is '0', inspecting operations will not be performed in the second stage 10*b* during the fourth clock tick.

FIG. 5 illustrates the fourth and the fifth stage, 10*d* and 10*e* respectively. In the fourth stage 10*d*, a block 4 and its associated PBRD 6 and execution parameter 7 are received from a ninth 109, tenth 110 and eleventh register 111 respectively. A fourth program counter 8*d* is sent from a twelfth register 112 to an editable, second instruction table 12*b* comprising a second instruction 13*b*. The fourth program counter 8*d* looks up the second instruction 13*b* and the second instruction 13*b* is sent to a logic unit associated with the fourth step 10*d*. If the value of the execution parameter is '1', the operations corresponding to the second instruction 13*b* are executed. Otherwise no operations will be executed. After that, the changed or unchanged block 4 and PBRD 6 are stored in a thirteenth register 113 and fourteenth register 114 respectively. Also, a fifth program counter 8*e* is created and stored in a fifteenth register 115. In this example the creation of the value of the fifth program counter 8*e* is based on a conditional criterion giving two different values of the fifth program counter 8*e* depending on whether the criterion is fulfilled or not. The execution parameter 7 remains unchanged and is stored in a sixteenth register 116.

In the fifth stage 10*e*, the block and its associated PBRD 6 and execution parameter 7 are received from the thirteenth, the fourteenth and the sixteenth register respectively.

The fifth program counter 8*e* is sent from the fifteenth register 115 to an editable, third instruction table 12*c*, which in the showed embodiment comprises a third instruction 13*c* and a fourth instruction 13*d*. The fifth program counter 8*e* looks up the corresponding instruction, which in FIG. 5 is the fourth instruction 13*d*. The fourth instruction 13*d* is sent to a logic unit associated with the fifth step 10*e*. Since the execution parameter has the value "1", the operations corresponding to the fourth instruction 13*d* are executed on the block 4 and/or the PBRD 6. After that, the block 4 and the PBRD 6 are stored in a seventeenth register 117 and an eighteenth register 118 respectively. The eighteenth register 118 is here the last of the registers for storing the PBRD 6. If the fifth stage 10*e* is the last stage in the processing means 3, there is no need to store the execution parameter 7 and a new program counter in this embodiment.

As indicated by FIG. 5, logic units associated with the fourth stage 10*d* and the fifth stage 10*e* respectively, may be different logic units, but may also be the same logic unit. This statement is true for all the logic units associated with the stages 10*a*-10*e*, i.e. a logic unit may be associated to only one of the stages, some of the stages or all of the stages. An ALU for processing all the stages would of course make the pipelined processing slower. Examples of additional or alternative means of the logic units are means for picking out a part or parts of the block, means for inserting data in a block 4, such as adding a new header to a packet, and an FPU (Floating Point Unit) for the handling of floating point operations. By way of example, the TOS (Type of Service) field in an IP-packet may be modified in anyone of the stages 10*a*-10*e*, even the second stage 10*b*.

Figure 6A:
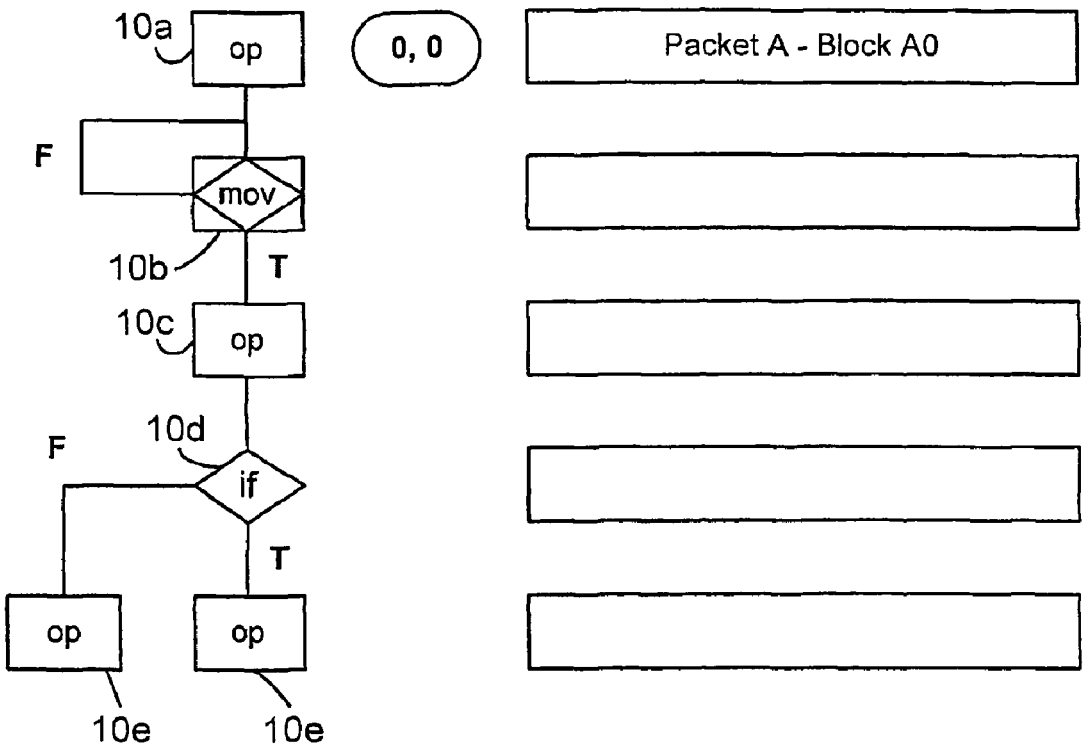
FIGS. 6a-f are schematic flow diagrams of the processing of a packet in the processing means.

FIG. 6*a*-6*e* illustrates the processing of the packet A through the five stages 10*a*-10*e*. In FIG. 6*a*, the first clock tick is illustrated and the Block A0 has entered the first stage 10*a*. The program counters comprise two variables, where the first variable is related to an instruction row in the editable instruction tables associated with the stages 10a-10e and the second variable is related to a stage. The first program counter is "0,0", where the first zero relates to an instruction in a first row in an editable instruction table, and the second zero relates to the first stage 10a. In this example, the execution parameter 7 for the Block A0 is "1" when it enters the first stage 10a and the execution parameters 7 for the subsequent Block A1, Block A2 and Block A3 are "0". The execution parameter value "1" for the Block A0 determines that the operations corresponding to the instruction in the first instruction row of the instruction table assoicated with the first stage 10a, shall be executed.

Figure 6B:
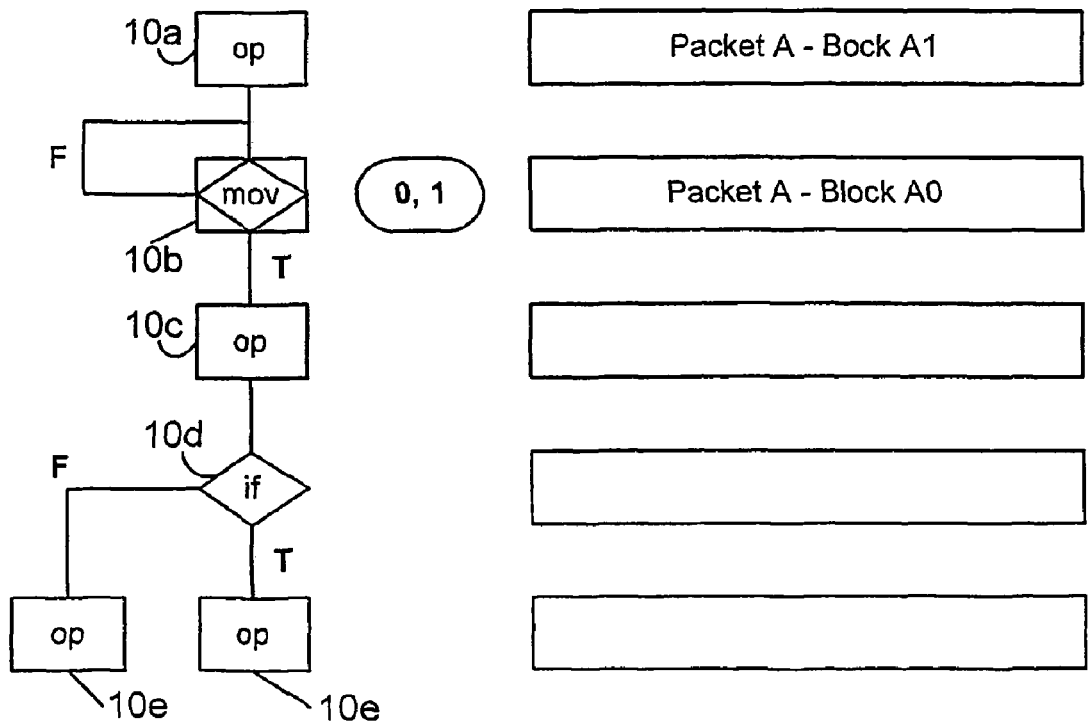

The second clock tick is illustrated in FIG. 6b. Now the Block A0 is processed in the second stage 10b according to FIG. 3. The second program counter is "0, 1". Since the Block A0 in this example does not satisfy the conditions checked in the inspection, the value "1" for the execution parameter 7 received in the second stage 10b, is sent back to the register from where it came, i.e. the second register 102, and a "0" is forwarded to the third register 103. The Block A1 has entered the first stage 10a, but since its associated execution parameter 7 has the value "0", no operations are performed on the Block A0 or the associated PBRD 6.

Figure 6C:
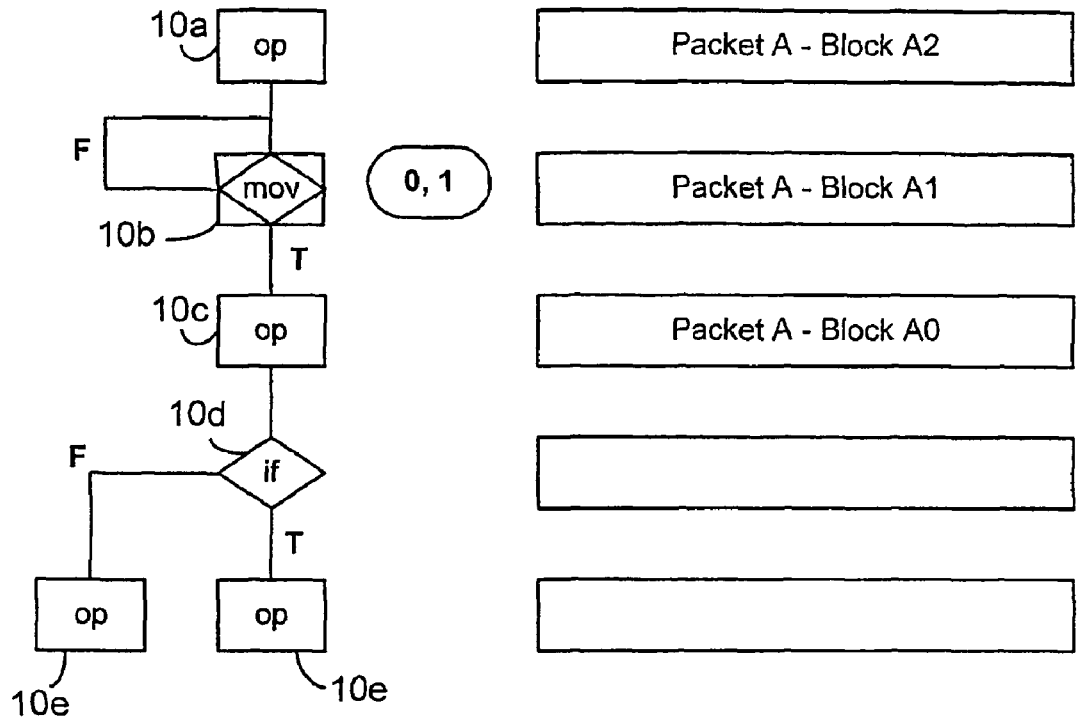

FIG. 6c illustrates the processing during the third clock tick. Block A0 has reached the third stage 10c, but since it now is associated with the value '0', no operations are performed on the Block A0 or any other data associated with block A0. Therefore, attention to the associated program counter is not necessary. On the analogy of the description related to FIG. 4, the Block A1 satisfies the condition checked in the inspection and a '1' is therefore forwarded to the third stage 10c. The Block A2 has entered the first stage 10a, but since the associated execution parameter is '0', no operations are executed.

Figure 6D:
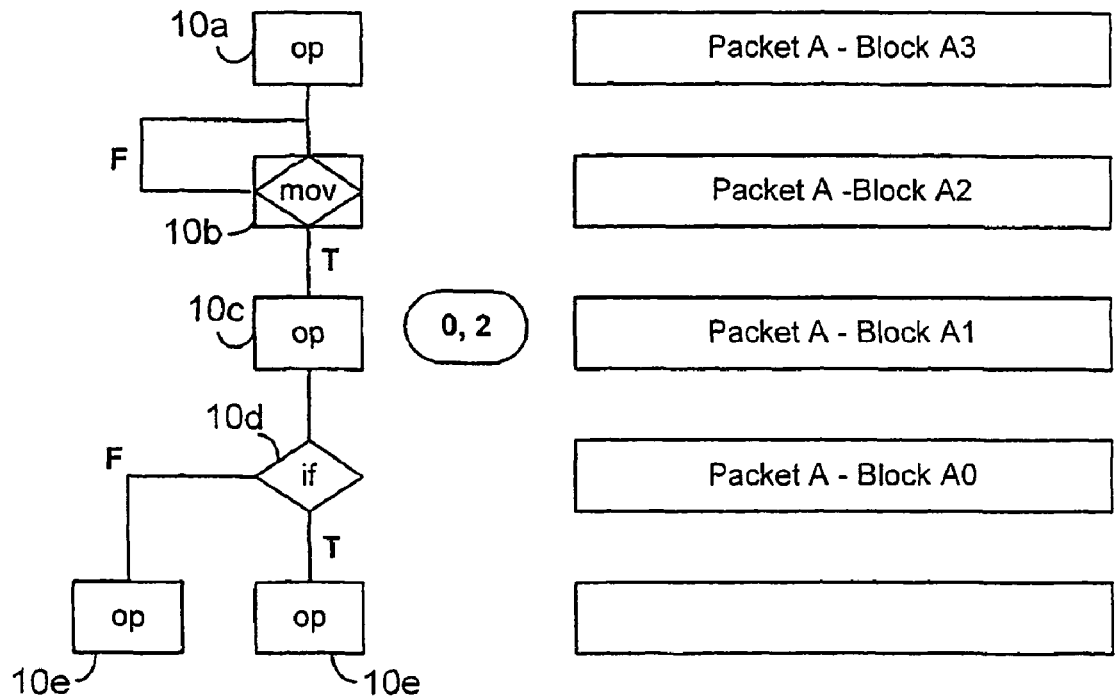

FIG. 6d illustrates the processing during the fourth clock tick. The Block A0 has reached the fourth stage 10d, but no operations are performed since the associated execution parameter 7 is '0'. The Block A1 is processed in stage 3, since the Block A1 is associated with the execution parameter having a value of '1'. Block A2 has reached the second stage 10b, but since the associated execution paramter of Block A2 is '0' the inspection operations are not executed. Thus, the Block A2 is only forwarded through the second stage 10b. The same is true for the following stages 10c-10e for the Block A2. Therefore, the processing of the Block A2 and its associated PBRD 6, execution parameter 7 and program counter will not be described more. The Block A3 has now entered the first stage 10a, but since the associated execution parameter 7 of the Block A3 is '0', the Block A3 and its associated PBRD 6, execution parameter 7 and program counter will be handled in the same way as the Block A2 and the PBRD 6, the execution parameter 7 and the program counter associated with Block A2. Hence the processing of the Block A3 will not be described more in detail.

Figure 6E:
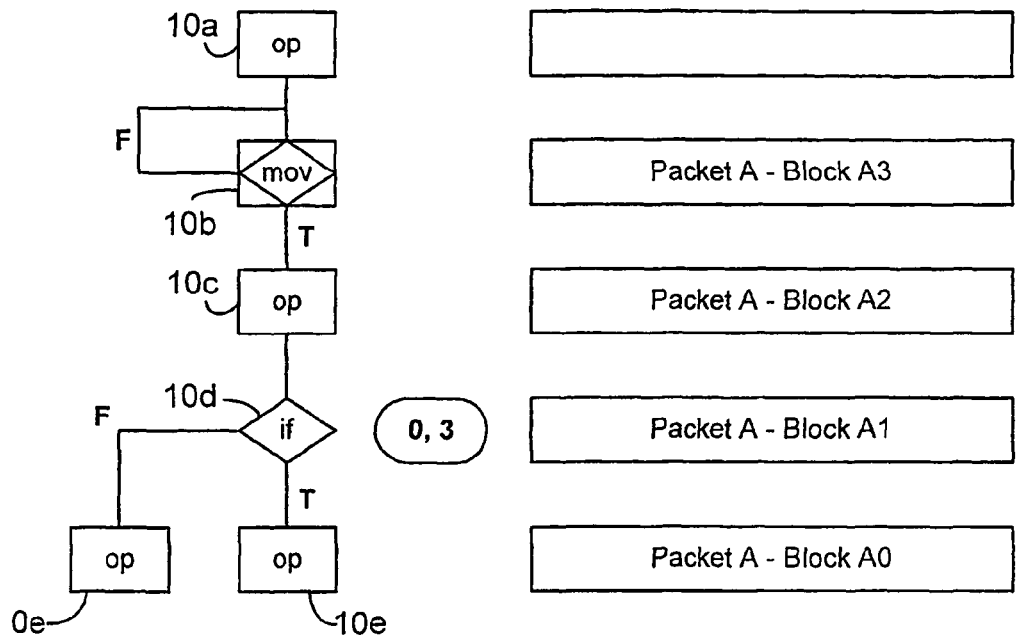

FIG. 6e illustrates the processing during the fifth clock tick. The Block A0 is now being forwarded through the fifth stage 10e and operations corresponding to the second instruction 13b is being executed on the Block A1 in the fourth stage 10d according to the description related to FIG. 5.

Figure 6F:
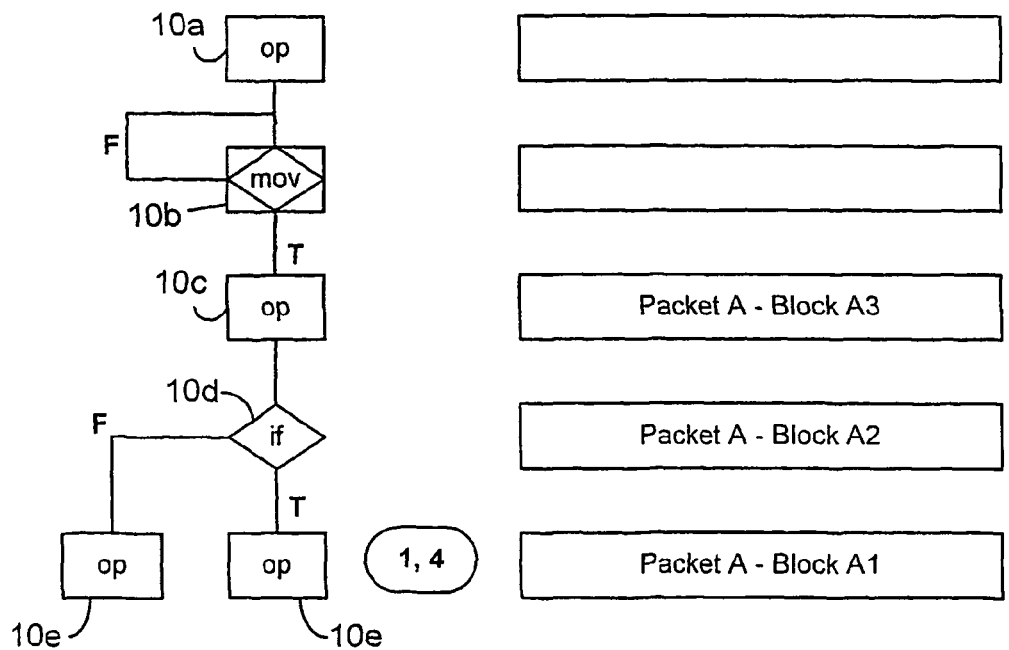

FIG. 6f illustrates the processing during the sixth clock tick. The Block A0 has now left the processing means 3. On the analogy of FIG. 5, the criterion checked in the fourth stage 10d leads to a fifth program counter 8e being "1, 4", where the variable "1" relates to the fourth instruction 13d and the variable 4 relates to the fifth stage 10e. Hence the operations corresponding to the fourth instruction 13d are executed.

When the Block A0 leaves the processing means 3, for instance to be sent to a serially coupled additional module 1, the Block A0 must be accompanied by a packet attribute 5 to provide information related to the Block A0 and the packet A, since the Block A0 is the first part of the packet A. Since the Block A0 after the second stage 10b is associated with an execution parameter 7 determining that no operations should be performed on the Block A0 and/or the associated PBRD 6, at least some data in the eighteenth register 118 is likely to be invalid due to possible changes in a subsequent block belonging to the packet A. Therefore, a forwarding means may be used for forwarding updated PBRD 6. In a first embodiment of the forwarding means, a fast and unclocked circuit is used for forwarding updated PBRD 6 to the eighteenth register 118 as soon as operations have been performed in one of the stages 10a-10e.

An example of the unclocked circuit is shown in FIG. 2. There, five multiplexors 14a-14e are serially coupled and are associated with one of the five stages 10a-10e each. Each multiplexor 14a-14e has a first port 15 and a second port 16 for input data, i.e. PBRD 6, and a third port 17 for the execution parameter 7, which is used as a control signal. When the execution parameter 7 is '0', the input signals from the second port 16 is used as an output signal and when the execution parameter is '1', the input signals from the first port 15 is used as the output signal. The output signal from all the multiplexors except the last one, is forwarded to the second input port 16 of the subsequent multiplexor. An output signal from the last multiplexor 14e, which is connected to the fifth stage 10e, is stored in the eighteenth register 118. The signals sent to the first input ports 15 of the mulitplexors 14a-14e comprise PBRD 6 that might have been changed in each one of the stages 10a-10e (depending on the operation and the execution parameter).

On a more general basis, provided that the number of stages 10a-10e in the processing means 3 are adapted for packets comprising a known maximum number of blocks, the unclocked circuit enables a block belonging to a packet to always be associated with updated PBRD when the block leaves the processing means 3. Thus a flexible processing means 3 is provided, having instruction tables in an arbitrary number of stages and allowing deep inspection in any of the stages.

Although the first embodiment shown in the FIGS. 2-6f comprises different registers 101-122 for the PBRD 6, the execution parameter 7 and the program counters 8 respectively, the scope of the invention also comprises embodiments where at least two of the PBRD 6, the execution parameter 7 and the program counters 8 share at least one register, for example one common input register and one common output register for each stage.

As already said, in the second stage described above, the processing of the execution parameter 7 is dependent on the predetermined condition. Although it is stated that certain operations shall be executed if the block 4 do not satisfy the condition, it is obvious that an equivalent embodiment is to execute said certain operations when a predetermined condition is satisfied. It only depends on how a condition is written. In other words, a condition can be either positive ("if X=Y then execute") or negative ("if Z NOT =Y then execute") .Furthermore, the condition shall throughout the description and appended claims be interpreted as a condition that may comprise one or more sub-conditions.

In the case where there are a large number of stages after a stage where the inspection is done and a processed packet comprises a large number of blocks, the first embodiment of the forwarding means may not be fast enough for forwarding updated PBRD 6 to the last register for the PBRD (register 118 in FIG. 2) before the first block of the packet has to leave the processing means 3. In that case, a second embodiment of the forwarding means is advantageous. The second embodiment is a clocked circuit, which comprises unclocked parts or circuits configured in the same way as in the first embodiment and at least one additional stage 20 placed between ordinary stages such as 10a-10e. For a processing means 3 with many pipeline stages, the second embodiment of the forwarding means preferably comprises strategically arranged additional stages 20 connected to each other through unclocked circuits according to the first embodiment of the forwarding means. The disadvantage of the second embodiment of the forwarding means compared to the first embodiment is that it introduced more pipeline stages in the processing means 3. A general example of the second embodiment is shown in FIG. 7, where a single additional stage 20 is arranged between the third stage 10c and the fourth stage 10d. Through the additional stage 20, at least five additional input registers for the additional stage 20 is introduced: a twenty-third register 123 for forwarded PBRD 6, a twenty-fourth register 124 for the PBRD 6 stored after the third stage 10c, a twenty-fifth register 125 for the execution parameter 7 stored in the third stage 10c, a twenty-sixth register 126 for the block 4 stored in the third stage 10c and a twenty-seventh register 127 for the fourth program counter 8d stored after the third stage 10c. The additional stage 20 preferably has no other purpose than enabling a clocked forwarding means that co-operates with the ordinary stages 10a-10e and achieves a more controlled forwarding of updated PBRD 6; thereby guaranteeing that updated PBRD 6 in a processing means 6 with many stages, is forwarded in time for leaving the processing means at the same clock tick as the first block of an associated packet. No instruction table or logic unit 11 has to be used in the additional stage 20, since the PBRD 6 in the twenty-third register only has to be forwarded through a subsequent unclocked circuit according to the first embodiment (to a possible subsequent further additional stage) and the data stored in the twenty-fourth, the twenty-fifth, the twenty-sixth and the twenty-seventh register respectively only has to be stored in the input registers of the fourth stage 10d, i.e. the tenth, the eleventh, the ninth and the twelfth register respectively, during a subsequent clock tick. In FIG. 7, the PBRD 6 in the twenty-third 123 register is received from the multiplexor 14c associated with the stage 10c during a clock tick and is forwarded to the second input port 16 of the multiplexor 14d associated with the stage 10d during the next clock tick.

The stages according to the invention may also comprise registers for storing block number data (BND) 18, which is unchangeable in the processing means 3. Such BND is here the block attribute showing the block number, i.e. a digit/digits that shows that the associated block 4 is the first block of a packet, a second block of the packet etc. These registers for storing the BND 18 for each stage has not been shown in FIGS. 1-7, since the storing of the BND 18 is done in the same way as blocks 4, i.e. each stage comprises an input register and output register for the BND 18 and the BND 18 is always forwarded to the next stage regardless of whether the execution parameter 7 for the associated block is 'preserved' in a stage where inspection according to the invention is performed. The shown registers for the blocks in the FIGS. 2-5 and 7 may alternatively be interpreted as also being adapted to store the BND 18 for each block 4 in the case where separate registers for the BND 18 are not considered needed.

However, the BND 18 plays an important role in a third embodiment of the forwarding means. As shown in FIG. 8, for illustration of the third embodiment, at least the last ordinary stage in the processing means 3 shall comprise a separate twenty-eighth register 128 as an output register for the BND 18. In the shown example, the fifth stage 10e illustrates the last ordinary stage. The twenty-eighth register 128 and a preceding twenty-ninth register 129 for the BND 18 shall be understood as indicating that separate registers for the BND 18 is used in every stage in the processing means 3. Alternatively, the logic unit 11 for the last stage has stored the block 4 and the BND 18 in different output registers, 117 and 128, which block 4 and BND 18 before the last stage have been stored in registers that are adapted to comprise both the block 4 and the BND 18. Another difference between the three configurations of the processing means 3 due to the three embodiments of the forwarding means, is that the fifth stage 10e in the third embodiment comprises a thirtieth register 130 as an output register for the execution parameter 7.

A FIFO buffer (First In-First Out buffer) 19 is used for ensuring that updated PBRD 6 always is associated with the first block of a packet that has been processed by the processing means 3. The FIFO buffer 19 is serially coupled to the last ordinary stage us of the processing means 3. In the shown example in FIG. 8, the FIFO buffer 19 comprises a shift register comprising a clocked circuit with five registers 211-215 which ensures a constant delay of the block in order to ensure that valid PBRD 6 is forwarded and associated with the first block of the packet when the first block leaves the FIFO buffer 19. The FIFO buffer 19 also comprises a first FIFO memory means 22 for storing valid PBRD and a second FIFO memory means 23 for storing received blocks 4; the first block that is stored is also the first one to leave the FIFO buffer. A logic unit 24 for the FIFO buffer is used for executing the operations of the FIFO buffer 19.

The method of operation of the FIFO buffer 19 will now be described with the help of FIGS. 9a-9g. The illustrated registers in the processing means 3 in FIGS. 9a-9g are the registers shown in the previous figures, but has been drawn differently in order to make the FIGS. 9a-9g clearer. The top row of registers in the processing means 3 is the three last registers for the PBRD 6, i.e. the tenth, the fourteenth and the eighteenth register, 110, 114 and 118 respectively. The symbol 'V' in one of these registers shows that a valid PBRD 6 is stored in that register. The second row of registers in the processing means 3 is the last three registers for the execution parameter 7, i.e. the eleventh, the sixteenth and the thirtieth register. In correspondence with the previous example, the value '1' indicates that an operation shall be performed in the receiving processing stage, and the value '0' indicate that no operations shall be executed. The third row of registers comprises the three last registers for the blocks, i.e. the ninth, the thirteenth and the seventeenth register, 109, 113 and 117 respectively. The bottom row comprises the three last registers for the BND 18, i.e. the twenty-eighth, the twenty-ninth and a thirty-first register, 128, 129 and 131 respectively. The packet A used as an example in FIG. 6a-6f is also used for illustrating the procedure of the third embodiment.

Figure 9A:
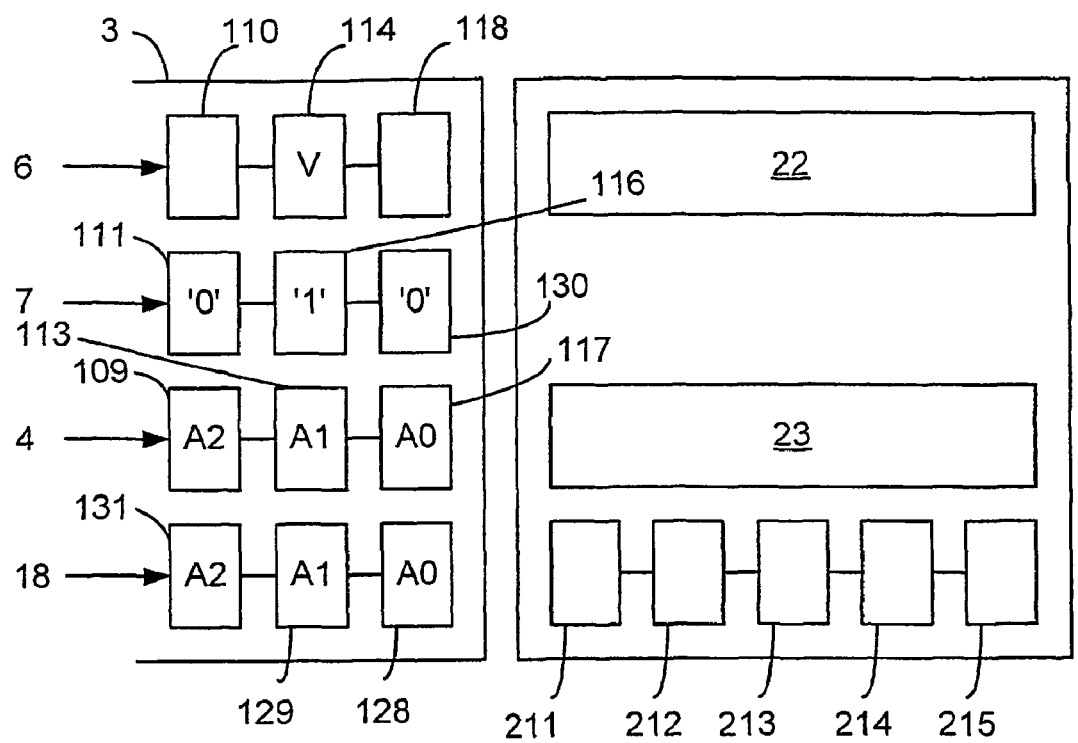
FIG. 9a-9g are schematic flow diagrams of the processing of the packet in a module according to the third embodiment of the invention.

In FIG. 9a, the fifth clock tick (cf. FIG. 6e) has ended. Block A0 and its associated BND and execution parameter, which is '0', is stored in the seventeenth, the twenty-eighth and the thirtieth register respectively. Block A1 and its associated BND and execution parameter, which is '1', is stored in the thirteenth, the twenty-ninth and the sixteenth register respectively. Block A2 and its associated BND and execution parameter, which is '0', is stored in the ninth, the thirty-first and the eleventh register respectively.

Figure 9B:
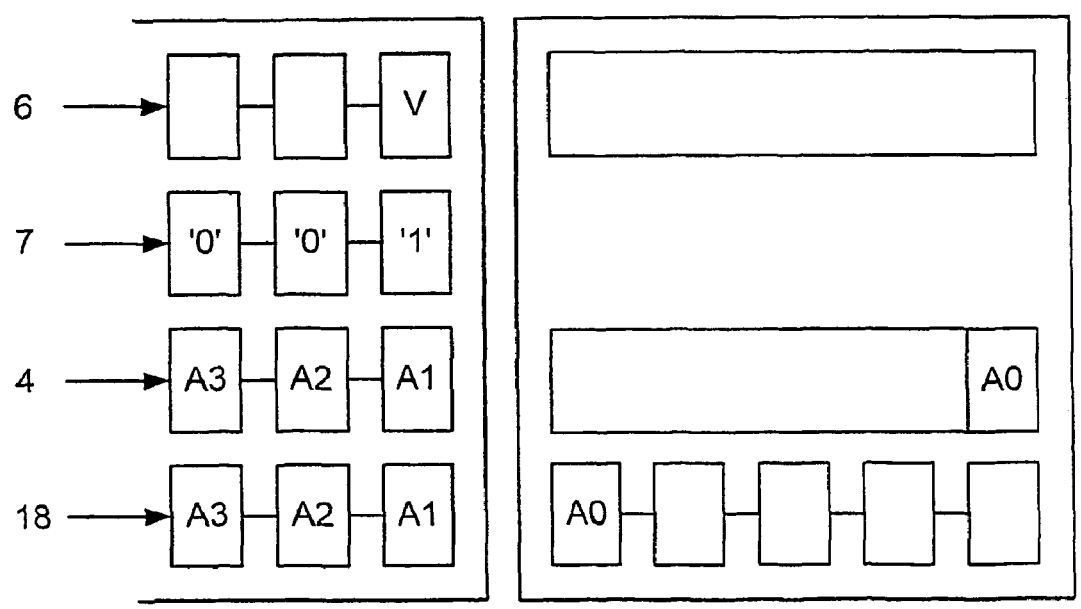

When the sixth clock tick begins, the value '0' is sent to the logic unit 24 for the FIFO buffer 19. The value '0' determines that the PBRD 6 in the eighteenth register 118 should not be forwarded to the first FIFO memory means 22 in the FIFO buffer 19. The Block A0 is stored in the second FIFO memory means 23 and the associated BND, which shows that Block A0 is the first block of packet A, is stored in the first of the five registers in the shift register, i.e. stored in register 211. Block A1 is handled in the fifth stage 10e, Block A2 is handled in the fourth stage 10d and Block A3 is handled in the third stage 10c according to the description in conjunction with FIG. 6f. FIG. 9b illustrates the positions of the involved data after the sixth clock tick.

Figure 9C:
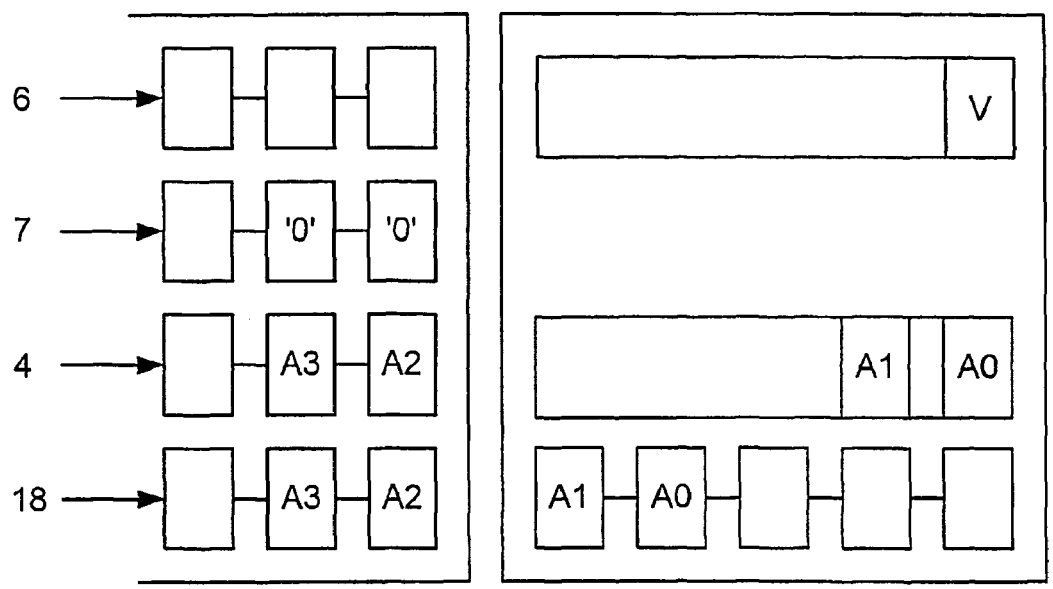

During the seventh clock tick, the value '1' for the PBRD of Block A1 is received by the logic unit 24 for the FIFO buffer 19 and determines that the PBRD in the eighteenth register 118 is valid. Therefore the logic unit 24 stores the valid PBRD in the first FIFO memory means 22 in the FIFO buffer 19. Furthermore, the Block A1 is stored in the second FIFO memory means 23, which already comprises the Block A0. Moreover, the BND associated with the Block A1 is stored in the register 211 and the BND associated with the Block A0 is forwarded to the second register 212 in the shift register. FIG. 9c illustrates the positions of the involved data after the seventh clock tick. During each clock tick, the logic unit 24 for the FIFO buffer 19 determines whether or not Block A0 and a value stored in the first FIFO memory means 22 shall be forwarded out from the FIFO buffer 19 to for instance a serially coupled second processing means. This is done by reading the value in the last of the five registers in the shift register, i.e. by reading the value in register 215. During the seventh clock tick, the Block A0 and the PBRD in the first FIFO memory means 22 is not forwarded out from the FIFO buffer 19, since the BND for the Block A0 has not been stored in the last register 215.

Figure 9D:
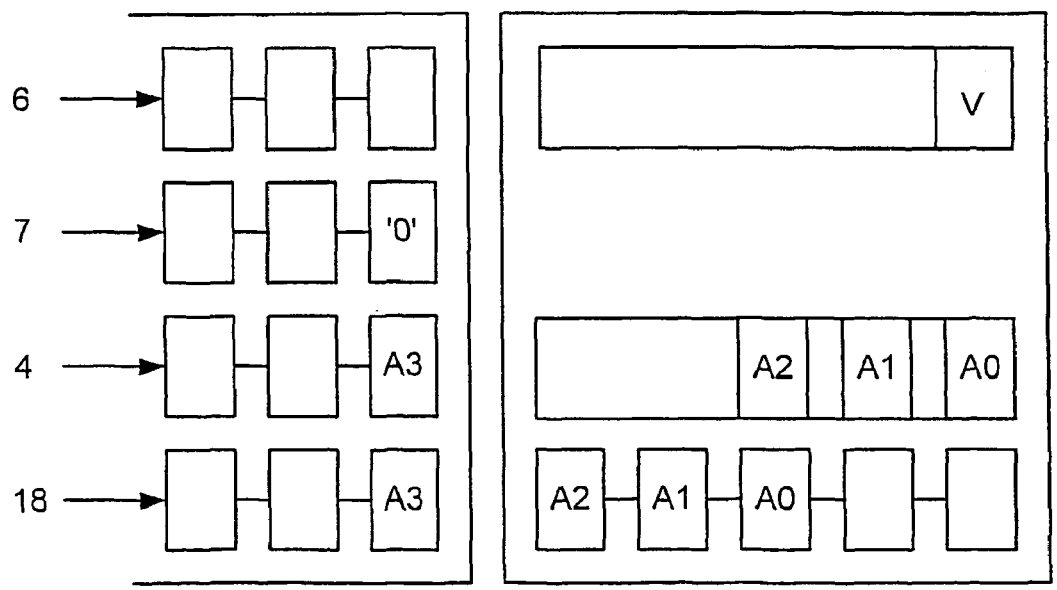

FIG. 9d illustrates the positions of the involved data after the eighth clock tick. The BND for the Block A0 is now stored in the third register 213 of the five registers in the shift register and the Block A2 is stored in the second FIFO memory means 23.

Figure 9E:
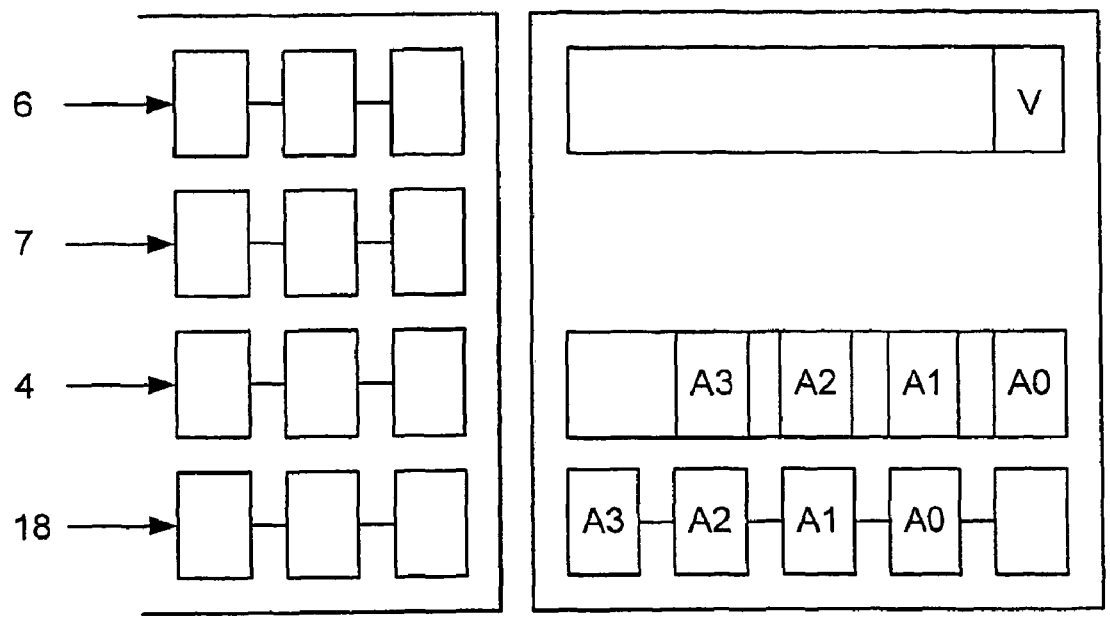

FIG. 9e illustrates the positions of the involved data after the ninth clock tick. The BND for the Block A0 is now stored in the fourth register 214 of the five registers in the shift register and the block A3 is stored in the second FIFO memory means 23. All the blocks of packet A has now left the processing means 3.

Figure 9F:
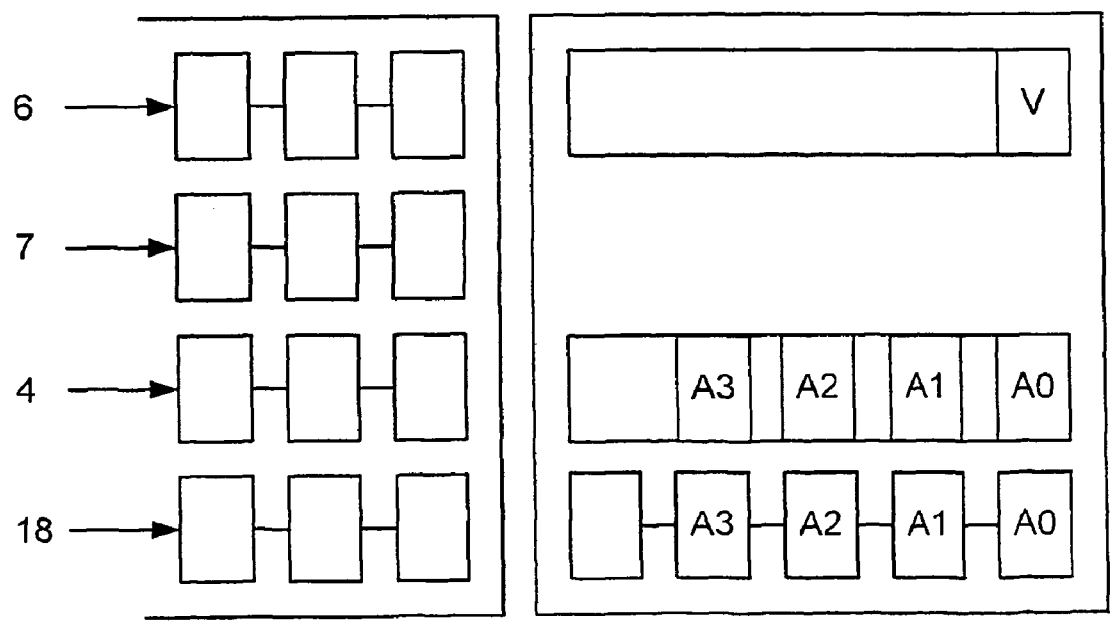

In the tenth clock tick, the BND for the Block A0 is stored in the last register 215 in the shift register. This is illustrated in FIG. 9f.

Figure 9G:
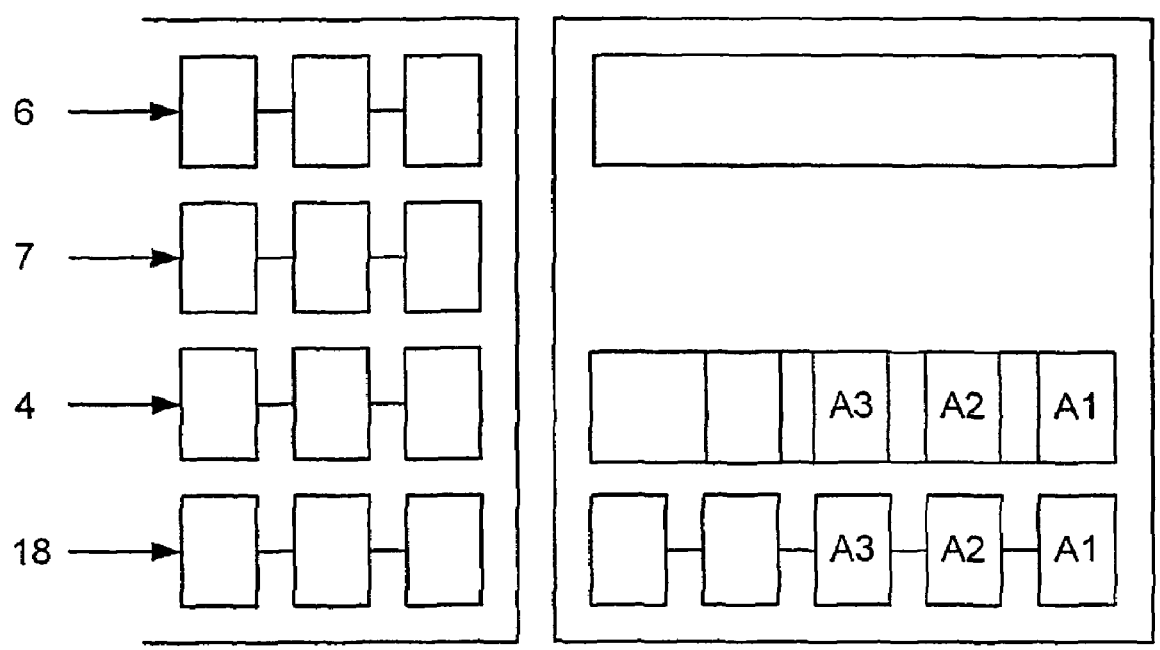

During the eleventh clock tick, the BND for the Block A0 is recognised by the logic unit 24 for the FIFO buffer 19. The logic unit 24 then reads the valid PBRD 6 from the first FIFO memory means 22 and the Block A0 from the second FIFO memory means 23 and forwards them out of the FIFO buffer 19. FIG. 9g illustrates the positions of the remaining blocks 1-3 and their respective BND:s. The BND for the Block A1 is now stored in the last register 215, the BND for the block A2 is stored in the fourth register 214 and the BND for the Block A3 is stored in the third register 213 of the shift register. The Block A1 will be forwarded out from the FIFO buffer 19 during the twelfth stage.

A second processing means may be serially coupled to the FIFO buffer and a second FIFO buffer may be serially coupled to the second processing means, thus creating a configuration of alternating processing means and FIFO buffers. It shall also be noted that the FIFO buffer 19 may be a part of the classification means 2. The FIFO buffer 19 determines the depth of the inspection of the packet. The number of registers in the shift register determines the maximum slide that may be performed for a packet, i.e. the FIFO buffer shown in FIG. 8, enables the processing means 3 to inspect a packet down to a fifth block of the packet. Advantages of the third embodiment of the forwarding means compared to the first and the second embodiment is that the FIFO-buffer 19 generally requires less surface, enables easier application of printed circuits and enables inspection of a block in the last stage (cf. stage 10e in FIG. 5) of the processing means 3. A disadvantage of the third embodiment compared to the first embodiment is that it increases the processing time for the packet due to the insertion of additional stages.

The invention claimed is:

1. A method in a pipeline processing stage (10b) in a processing means (3), comprising the steps of:
   receiving, in parallel, a first block from a first register (101) and a first execution parameter associated with the first block from a second register (102), the first execution parameter having a first value;
   inspecting a set of data being at least a part of the first block; and
   determining that the set of data differs from a predetermined condition, and
   upon determining that the set of data differs from the predetermined condition, i) storing a second execution parameter in a third register (103) and ii) storing a third execution parameter in the second register (102),
   wherein the second execution parameter has a second value and is associated with the first block during a next pipeline processing stage (10c) for the first block and the third execution parameter has the first value and will be associated with a second block, which is to be received in the pipeline processing stage after the first block has been forwarded to the next pipeline processing stage (10c).

2. A method according to claim 1, where the first block and the second block are parts of a data packet.

3. A method according to claim 2, comprising the steps of:
   receiving packet and block related data (6) from a fourth register (104) and, if the set of data differs from the predetermined condition, storing the packet and block related data (6) in the fourth register (104) after inspection of the set of data.

4. A method according to claim 1, comprising the steps of:
   receiving a program counter from a fifth register (105); looking up a first instruction(13a) in an editable instruction table (12a) associated with the pipeline processing stage(10b); and, if the set of data differs from the predetermined condition, storing the program counter in the fifth register (105) after the inspection of the set of data.

5. A method in a pipeline processing stage (10b) in a processing means (3), comprising the steps of:
   receiving, in parallel, a first block from a first register(101) and a first execution parameter associated with the first block from a second register (102), the first execution parameter having a first value;
   inspecting a set of data being at least a part of the first block; and
   determining that the set of data satisfies a predetermined condition, and
   upon determining that the set of data satisfies the predetermined condition, i) storing a second execution parameter in a third register (103) and ii) storing a third execution parameter in the second register (102),
   wherein the second execution parameter has the first value and is associated with the first block during a next pipeline processing stage (10c) for the first block and the third execution parameter will be associated with a second block, which is to be received in the pipeline processing stage (10b) after the first block has been forwarded to the next pipeline processing stage (10c).

6. A method according to claim 5, where the first block and the second block are parts of a data packet.

7. A method according to claim 6, comprising the steps of: receiving packet and block related data (6) from a fourth register (104) and, if the set of data satisfies the predetermined condition, forwarding the packet and block related data (6) to a fifth register (108) after inspection of the set of data.

8. A method according to claim 5, comprising the steps of: receiving a program counter (8b) from a sixth register (105); looking up a first instruction (13a) in an editable instruction table (12a) associated with the pipeline processing stage (10b); and, if the set of data satisfies the predetermined condition, storing a second program counter (8c) in a seventh register (107) after inspection of the set of data.

9. A pipeline processing means (3) for a method according to claim 1, comprising registers (101,106,109,113,117,121) for storing blocks (4) of data being processed in at least two pipeline processing stages and at least one logic unit (11) for executing operations on at least one of the blocks (4), and characterised by registers (102,103,111, 116,120) for storing execution parameters (7) associated with the blocks (4), the execution parameters (7) being used in the at least two pipeline processing stages for determining whether or not at least one operation shall be executed in the at least two pipeline processing stages.

10. A pipeline processing means (3) according to claim 9, where said blocks (4) are parts of a data packet.

11. A pipeline processing means (3) according to claim 10, comprising registers (104, 108,110,114,118,119) for storing packet and block related data (6) associated with each one of the blocks (4).

12. A pipeline processing means (3) according to claim 11, comprising an unclocked circuit adapted to receive the packet and block related data (6) and send the packet and block related data (6) to a last register (118) of the registers (104, 108,110,114,118, 119) for storing the packet and block related data (6).

13. A pipeline processing means (3) according to claim 12, wherein the unclocked circuit comprises at least one multiplexer (14a-14e).

14. A pipeline processing means according to claim 12, wherein the unclocked circuit comprises one multiplexer connected to each one of the at least two processing stages, the multiplexer comprising a first port (15) and a second port (16) adapted to receive packet and block related data (6) and a third port (17) adapted to receive a signal representing a value of one of the execution parameters (7).

15. A pipeline processing means (3) according to claim 14, comprising a clocked forwarding means that comprises at least one additional pipeline processing stage (20) between at least two of the at least two pipeline processing stages, the at least one additional pipeline processing stage (20) comprising a register (123) connected to the unclocked circuit between two multiplexers of the unclocked circuit.

16. A pipeline processing means (3) according to claim 9, comprising registers (105,107,112,115,122) for storing program counters associated with the blocks (4) and at least one storage means for storing an editable instruction table for each one of the at least two pipeline processing stages.

17. A module (1) for a method according to claim 1, comprising a pipeline processing means (3) comprising registers (101,106,109,113,117,121) for storing blocks being processed in at least two pipeline processing stages and at least one logic unit (11) for executing operations on at least one of the blocks (4), characterised by a FIFO buffer (19) comprising a shift register and is serially coupled to the processing means (3), which comprises registers (102,103,111,116,120) for storing execution parameters (7) associated with the blocks (4), the execution parameters (7) being used in the at least two pipeline processing stages for determining whether or not at least one operation shall be executed in the at least two pipeline processing stages.

18. A module (1) according to claim 17, wherein the FIFO buffer (19) comprises at least one first FIFO memory means (22) for storing packet and block related data (6) and a second FIFO memory means (23) adapted to store blocks, and wherein the shift register is adapted to receive and forward block number data (18) associated with the blocks.

19. A module (1) for a method according to claim 1, comprising a classification means (2) for matching or identifying blocks (4) of data, a pipeline processing means (3) comprising registers (101,106,109,113,117,121) for storing the blocks being processed in at least two pipeline processing stages and at least one logic unit (11) for executing operations on at least one of the blocks (4), characterised in that the processing means (3) comprises registers (102,103,111,116, 120) for storing execution parameters (7) associated with the blocks (4), the execution parameters (7) being used in the at least two pipeline processing stages for determining whether or not at least one operation shall be executed in the at least two pipeline processing stages.

20. An integrated circuit (9), characterised by at least one module (1) according to claim 17.

21. An integrated circuit (9), characterised by at least one module (1) according to claim 19.

22. A computer unit, comprising:
at least one integrated circuit (9), characterised in that the at least one integrated circuit (9) comprises at least one module (1) according to claim 17.

23. A computer unit, comprising:
at least one integrated circuit (9), characterised in that the at least one integrated circuit (9) comprises at least one module (1) according to claim 19.

* * * * *